United States Patent Office 3,399,166
Patented Aug. 27, 1968

3,399,166
SILICA PIGMENT REINFORCED HYDROCARBON RUBBER COMPOUNDED STOCKS AND VULCANIZATES THEREOF AND PROCESSES FOR PRODUCING THE SAME
Oliver W. Burke, Jr., Fort Lauderdale, Fla.
(P.O. Box 1266, Pompano Beach, Fla. 33061)
No Drawing. Filed Aug. 16, 1965, Ser. No. 480,151
8 Claims. (Cl. 260—41.5)

ABSTRACT OF THE DISCLOSURE

Herein it is shown that 100 pts. sulfur vulcanizable rubber can advantageously be reinforced with 5-80 parts of silica pigment which has been prepared by reacting an aqueous sodium silicate solution with carbon dioxide and treating the resulting silica pigment with sulfuric acid and/or aluminum sulfate to a pH below 5 and drying the same, without undue retardation of the cure, provided the compounding recipe is formulated to contain magnesium oxide 1 to 10 parts, together with 0.5 to 10 parts of zinc oxide and 0.3 to 5 parts alkanolic amine.

---

The present invention relates to the compounding of hydrocarbon rubbers for the production of vulcanizates with silica pigment as a reinforcing filler therein, and aims generally to improve the same.

It is desirable to use silica pigment in the reinforcing of hydrocarbon rubber vulcanizates to provide light colored vulcanizates not obtainable with carbon black reinforcement and/or to improve the cracking, tear resistance, and/or other properties of rubber vulcanizates.

The silica pigments now commercially available are essentially neutral, e.g. the specifications for Hi-Sil 233 and Hi-Sil 215 (commercial trademarked products) desne the pH of a 5% water suspension thereof as 6.5 to 7.3. These essentially neutral silica pigments disperse only moderately well in hydrocarbon rubbers. The present applicant has discovered that by preparing silica pigments with a pH below 5, the pigments may be caused to disperse in hydrocarbon rubbers much more readily and completely than do the neutral silica pigments of commerce, but that the acidic silica pigments tend to retard curing of the rubbers and in certain instances may even tend to catalyse the degradation of certain hydrocarbon polymers such as Hevea.

An object of the present invention is to afford a process which will enable one to overcome the above and other disadvantages heretofore associated with the use of silica pigments in the reinforcement of sulfur vulcanizable hydrocarbon rubbers.

Another object is to afford a process which will enable one to effect uniform and desirable reinforcement of sulfur vulcanizable hydrocarbon rubbers with acidic silica pigments having a pH below 5.

Another object is to afford a process which will enable one to obtain silica pigment reinforced hydrocarbon rubber vulcanizates having improved physical characteristics.

Still another object is to afford an improved process for preparing vulcanizable hydrocarbon rubbers for vulcanization using acidic silica pigment as a reinforcing filler therein.

Yet another object is to provide improved compounded stocks of vulcanizable hydrocarbon rubbers as articles of commerce ready for use in the production of vulcanizates.

Still another object of the invention is the provision of silica pigment reinforced hydrocarbon rubber vulcanizates of improved physical properties.

Other objects and advantages of the invention will be apparent to those skilled in the art from the following general and specific descriptions of illustrative embodiments thereof.

The invention resides in the new and useful features and combinations characterizing the processes and products herein exemplified, and is more particularly defined in the appended claims.

General description

In essence the present invention is based on the discovery that by compounding sulfur vulcanizable hydrocarbon rubbers with a compounding recipe particularly characterized in that it contains as cooperating ingredients (1) acidic silica pigment having a pH below 5 in combination with (2) magnesium oxide, (3) zinc oxide, and (4) an alkanolic amine, then marked advantages are attained in the ease and completeness of the dispersion of the silica pigment, and in the properties of the resulting vulcanizates.

Among the sulfur vulcanizable hydrocarbon rubbers to which the invention is applicable are the natural rubbers, especially Hevea; the hydrocarbon homopolymer rubbers, e.g. polybutadiene rubbers and polyisoprene rubbers; the hydrocarbon diene copolymer rubbers, e.g. the butadiene-styrene copolymer rubbers, butyl rubbers, ethylene-propylene terpolymer hydrocarbon rubbers; and other vulcanizable hydrocarbon rubbers; and combinations of two or more of the foregoing.

The acidic silica pigments employable in practicing the invention are silica pigments of rubber reinforcing grade which, however, have been so prepared that the pH of a 5% water suspension thereof is below 5. Such preparation of the silica pigments may be effected by treatment with sulfuric acid and/or aluminum sulfate. The acidic silica pigment may be masterbatched with all or part of the hydrocarbon rubbers to be used.

The magnesium oxide or magnesia employable in the practice of the invention is any rubber grade of essentially magnesium oxide, including, but not limited to, the lightly calcined varieties.

The zinc oxide employable in practicing the invention is any rubber grade of zinc oxide.

The alkanolic amines employable in practicing the invention are amines having one or more alkanol and/or alkanolether groups, wherein the alkylene moieties individually are either saturated or unsaturated and individually contain from 2 to 18 carbon atoms. Thus the amines employable herein are those having the formula

wherein $x$, $y$, and $z$ are individually selected from the group consisting of —H, —RH, —ROH, and —ROROH, at least one of $x$, $y$ or $z$ being selected from the sub-group —ROH and —ROROH, and wherein the R members are individually selected from the group consisting of the saturated and unsaturated alkylene radicals having 2 to 18 carbon atoms. Typical examples of this class of amines are set forth in Table I:

TABLE I.—Typical alkanolic amines monoethanolamine
diethanolamine
triethanolamine
stearyl-ethanolamine
distearyl-ethanolamine
oleyl-ethanolamine
monopropanolamine
dipropanolamine
tripropanolamine
monobutanolamine
dibutanolamine
tributanolamine
diglycolamine The sulfur vulcanizable hydrocarbon rubber may be compounded with the compounding recipe including the four above designated essential ingredients in any suitable manner, but it is preferred to first incorporate the acidic silica pigment into the hydrocarbon rubber, followed by the magnesium oxide, then the zinc ocide, then the alkanolic amine and the curing ingredients including the accelerators and the sulfur and/or selenium and/or tellurium vulcanizing agents. In the recipes employed in the examples hereinafter, the alkanolic amines have been added after the curing ingredients, as is most preferred.

The quantities of the four above designated essential ingredients employable in accordance with the invention lie in the following ranges based on 100 parts of the hydrocarbon rubber:

| | Parts |
|---|---|
| (1) Acidic silica pigment | 5–80 |
| (2) Magnesium oxide | 1–10 |
| (3) Zinc oxide | 0.5–10 |
| (4) Alkanolic amine | 0.3–5 |

The curing ingredients, softeners, extenders, antioxidants, antiozonants, and other compounding ingredients may be used in any suitable conventional amounts and may be incorporated in the compound in any known or conventional sequence. When N,N'-di-ortho-tolylguanidine (DOTG) is employed as accelerator, 0.5 to 3.0 parts thereof per 100 of rubber, by weight, is suitable.

The above general features of the invention, and features contributory thereto in particular embodiments, will be more fully understood by reference to the following examples of procedures and products embodying the invention.

EXAMPLE I

A. PREPARATION OF THE ACIDIC SILICA PIGMENT

The silica pigment employed in the illustrative and compartive examples herein was prepared according to copending applications Ser. Nos. 458,131 and 458,480 filed May 24, 1965 (Cases 48A and 49). In this preparation, 141 kilograms (200 moles $Na_2O/(SiO_2)_{3.22}$) of 41° Bé. commercial sodium silicate was dissolved in 630 liters of water and placed in a 270 gallon reactor agitated with a single blade agitator at 75 r.p.m. The reactor and sodium silicate solution were heated to 80° C. and so maintained.

Carbon dioxide was allowed to flow into the agitated sodium silicate solution at a relative constant rate as set forth in Table A and after 150 minutes 57.6 moles of carbon dioxide had been introduced and the partially acidified sodium silicate solution took on the blue Tyndall effect color. At this time 150 liters of water were quickly added (i.e. in less than 5 minutes) to dilute the sodium silicate and the acidulation with carbon dioxide was continued.

The silica slurry from the reactor was filtered and washed until the soluble salts of the silica slurry were less than 1% by weight and was designated silica 112.

A 9,000 gram portion of the washed silica 112 in the form of a 7.3% slurry (dry basis by weight) and having a pH of 8.2, while agitating was treated with 125 ml. of 10% sulfuric acid and the pH was 4.0. This acidic silica slurry was filtered and dried at 105° C. and micropulverized and the resulting acidic silica pigment is herein designated silica 112B.

B. COMPOUNDING AND CURING OF ILLUSTRATIVE AND COMPARATIVE EXAMPLES

Separate portions of silica 112B were compounded according to recipe A and receipe B given in Table B.

TABLE B

| Compounding Ingredients | Quantities (wt. parts) | |
|---|---|---|
| | Recipe A | Recipe B |
| Butadiene-styrene copolymer (SBR-1502) | 100 | 100 |
| Silica pigment material 112B | 50 | 50 |
| Antioxidant (Antioxidant 2246) 2,2-methylenebis (4-methyl-6-t. butylphenol) | 2 | 2 |
| Carbon black (Statex M) [1] | 2 | 2 |
| Paracoumarone-indene resin (Cumar RH) | 10 | 10 |
| Magnesia | 4 | 0 |
| Zinc oxide | 1 | 1 |
| N-tert-butyl-2-benzothiazole-sulfenamide (Santocure NS) | 0.75 | 0.75 |
| N,N'-di-o-tolylguanidine (DOTG) | 1.5 | 1.5 |
| Sulfur | 3 | 3 |
| Modified phthalic anhydride (Retarder PD) | 0.75 | 0.75 |
| Alkanolic amine: | | |
|    Triethanolamine [2] | 1 | 1 |
|    Monoethanolamine | 1 | 1 |

[1] Carbon black optional and at 2 part level no appreciable effect on vulcanizate properties.
[2] This alkanolamine may be replaced by 1 part of alkanoletheramine, e.g. diglycolamine.

In compounding the stocks the silica pigment material was milled into SBR-1502 together with the antioxidant and other compounding ingredients and the stock was aged overnight and then re-milled and cured for 120 minutes at 287° F.

The compound prepared by Recipe A and its vulcanizate were designated Example 1—wherein the rubber was compounded with the acidic silica pigment 112B and with 4 parts of light calcined magnesium oxide, 1 part zinc oxide, 1 part each of monoethanolamine and triethanolamine and the accelerator system included the basic accelerator N,N'-di-o-tolylguanidine.

The comparative Example 1C prepared by Recipe B was compounded with the acidic silica pigment and other ingredients in exactly the same manner as Example 1 except that the magnesium oxide was not included in the recipe.

C. TEST RESULTS

The vulcanizates of Examples 1 and 1C were tested and the physical properties thereof were determined and are set forth in Table C.

TABLE C

| Example No. | Hardness (Shore A) | 300% modulus (p.s.i.) | 500% modulus (p.s.i.) | Ult. tensile (p.s.i.) | Elong. (percent) | Heat buildup $\Delta H$, ° C. | Comp. set (percent) |
|---|---|---|---|---|---|---|---|
| 1 | 62 | 800 | 2,145 | 3,945 | 650 | 37 | 0.9 |
| 1C | 68 | 735 | 1,820 | 3,790 | 675 | 47 | 4.2 |

Table A herein sets forth the various rates of acidulation with carbon dioxide employed throughout the acidification.

TABLE A.—ACIDULATION RATE

| Time, minutes (cumulative) | $CO_3$ moles (cumulative) | Acidification, percent (cumulative) |
|---|---|---|
| 0 | 0 | 0 |
| 150 | 57.6 | [1] 28.8 |
| 720 | 244 | 122 |

[1] Tyndall effect noticeable and added 150 liters of water.

It is to be noted that the use of the compounding recipe including magnesium oxide together with zinc oxide and with the alkanolamines reduced the hardness of the vulcanizate, improved the modulus and tensile strength, and especially reduced the heat buildup properties of the vulcanizate as compared with vulcanizates of compounds in which magnesium oxide was not employed with the silica.

When the recipes are varied to exclude the monoethanolamine and triethanolamine the physical properties of the vulcanizates, especially in the case of the comparative example, are much inferior. When recipes A and B are concurrently varied by increasing the quantity of zinc oxide to 5 parts, with the quantity of magnesium oxide in recipe A either remaining at 4 parts or reduced to 2 parts, the comparative results, as exemplified in Table C, are similar in that they still greatly favor the compounds prepared in accordance with the so modified recipe A which contains magnesium oxide together with the other cooperating ingredients.

While there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

I claim:
1. The process of preparing sulfur vulcanizable hydrocarbon rubber for vulcanization which comprises:
   (a) compounding 100 parts by weight of said vulcanizable hydrocarbon rubber with a compounding recipe particularly characterized in that it contains, by weight,
      (i) 5 to 80 parts of acidic silica pigment,
      (ii) 1 to 10 parts of magnesium oxide,
      (iii) 0.5 to 10 parts of zinc oxide, and
      (iv) 0.3 to 5 parts of alkanolic amine
   (b) said acidic silica pigment having been prepared by reacting an aqueous solution of sodium silicate with carbon dioxide and treating the resulting silica pigment with material from the group consisting of sulfuric acid and aluminum sulfate to a pH below 5 and drying the same, and
   (c) said alkanolic amine having the formula

wherein x, y, and z are individually selected from the group consisting of —H, —RH, —ROH, and —ROROH, at least one of x, y, or z being selected from the sub-group —ROH and —ROROH, and wherein the R members are individually selected from the group consisting of the saturated and unsaturated alkylene radicals having from 2 to 18 carbon atoms.

2. The process of forming sulfur vulcanizable hydrocarbon rubber vulcanizates which comprises: (a) compounding a sulfur vulcanizable hydrocarbon rubber by the process of claim 1, and (b) vulcanizing the so compounded rubber.

3. Compounded sulfur vulcanizable hydrocarbon rubber prepared by the process of claim 1.

4. A vulcanizate of the compounded vulcanizable hydrocarbon rubber of claim 3.

5. The process defined in claim 1, wherein said alkanolic amine consists essentially of alkanolamine.

6. The process defined in claim 5, wherein said alkanolic amine consists essentially of alkanolether amine.

7. The process defined in claim 1, wherein said alkanolic amine is selected from the alkanolic amines listed in Table A of the foregoing specification.

8. The process of preparing sulfur vulcanizable hydrocarbon diene polymer or copolymer rubber for vulcanization which comprises:
   (a) compounding 100 parts by weight of said vulcanizable hydrocarbon diene rubber with a compounding recipe particularly characterized in that is contains, by weight,
      (i) 5 to 80 parts of acidic silica pigment,
      (ii) 1 to 10 parts of magnesium oxide,
      (iii) 0.5 to 10 parts of zinc oxide,
      (iv) 0.3 to 5 parts of alkanolic amine, and
      (v) 0.5 to 3 parts of N,N'-di-orthotolylguanidine,
   (b) said acidic silica pigment having been prepared by reacting an aqueous solution of sodium silicate with carbon dioxide and treating the resulting silica pigment with material from the group consisting of sulfuric acid and aluminum sulfate to a pH below 5 and drying the same, and
   (c) said alkanolic amine having the formula

wherein x, y, and z are individually selected from the group consisting of —H, —RH, —ROH, and —ROROH, at least one of x, y, or z being selected from the sub-group —ROH and —ROROH, and wherein the R members are individually selected from the group consisting of the saturated and unsaturated alkylene radicals having from 2 to 18 carbon atoms.

References Cited

FOREIGN PATENTS

| | | |
|---|---|---|
| 870,173 | 6/1961 | Great Britain. |
| 953,423 | 3/1964 | Great Britain. |

ALLAN LIEBERMAN, *Primary Examiner.*

UNITED STATES PATENT OFFICE
CERTIFICATE OF CORRECTION

Patent No. 3,399,166                                            August 27, 1968

Oliver W. Burke, Jr.

It is certified that error appears in the above identified patent and that said Letters Patent are hereby corrected as shown below:

Column 1, line 37, "desne" should read -- define --. Column 3, line 39, "compartive" should read -- comparative --. Column 6, line 13, "Table A" should read -- Table I --.

Signed and sealed this 13th day of January 1970.

(SEAL)
Attest:

Edward M. Fletcher, Jr.                          WILLIAM E. SCHUYLER, JR.
Attesting Officer                                           Commissioner of Patents